Oct. 3, 1944. W. R. DRAY 2,359,409
GATHERING MECHANISM FOR HARVESTERS
Original Filed July 1, 1935 2 Sheets-Sheet 1
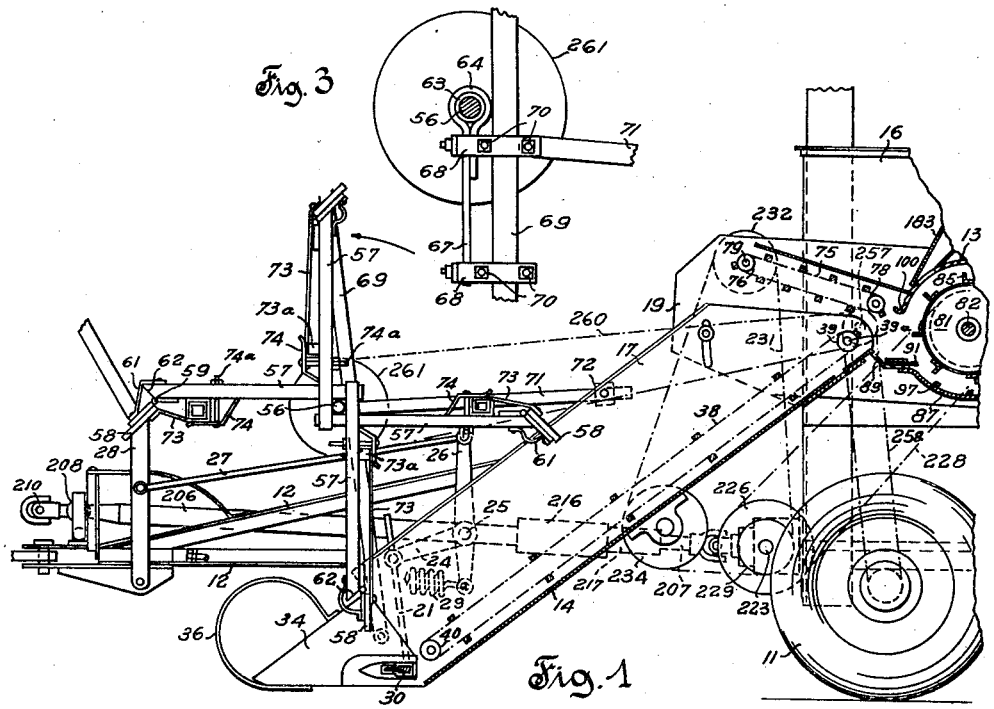

Patented Oct. 3, 1944

2,359,409

UNITED STATES PATENT OFFICE 2,359,409

GATHERING MECHANISM FOR HARVESTERS

Walter R. Dray, Kendall Township, Kendall County, Ill., assignor to Allis-Chalmers Manufacturing Company, Milwaukee, Wis., a corporation of Delaware Original application July 1, 1935, Serial No. 29,216. Divided and this application June 29, 1940, Serial No. 343,123

4 Claims. (Cl. 56—122)

This invention relates in general to improvements in harvesting machines and it has special utility in connection with that type of such machines as are known as harvester-threshers or combines which are capable of gathering the crop and threshing the same during travel of the machine through the field; and the invention is more particularly concerned with improvements in the mechanism, comprising a gathering reel and its drive, for gathering the crop from the field and conveying it to a suitable point for further processing, and especially in that portion of such mechanism concerned with the gathering reel and the drive therefor.

The present application is a division of applicant's copending application, Serial No. 29,216, filed July 1, 1935, which has matured into Patent No. 2,262,453, granted November 11, 1941.

The more modern and lighter weight commercial types of harvester-threshers or combines are designed to operate at relatively high speed of travel through the field, a well known type of such a machine including a header platform carrying a cutting sickle at its forward or lower end, the platform being adjustable up and down, through pivotal mounting thereof adjacent its rear end to vary the position of the sickle with respect to the ground, and the platform supporting an adjustable rotatable gathering reel positioned over the cutting sickle. In such light weight, and hence relatively inexpensive, harvester-threshers, it is especially desirable to provide a simple and efficient form of driving mechanism for the gathering reel, such driving mechanism being effective to provide the desired driving of the reel irrespective of its position of adjustment.

The present invention contemplates and has for an object thereof the provision, in connection with a harvester of the above referred to general character, an improved design and construction of operating or driving mechanism for the gathering reel, and the disposition of such driving mechanism with respect to the header platform to facilitate desired and efficient operation of the reel in its various positions of adjustment.

It is a further object of this invention to provide an improved design, construction and disposition of operating mechanism for the gathering reel of a harvester of the above general character and involving the use of a single flexible drive element of the belt type from a shaft substantially coaxial with the axis of pivotal mounting of the header platform to the shaft of the adjustable reel.

These and other objects and advantages are attained by the present invention, various novel features of which will be apparent from the description and accompanying drawings, disclosing an embodiment of features of the invention, and will be more particularly pointed out in the claims.

In the accompanying drawings:

Fig. 1 is a fragmentary vertical sectional elevation of a harvester-thresher, such as is disclosed in the above mentioned parent application, the plane of section being that of the line I—I of Fig. 2;

Fig. 2 is a fragmentary plan view of the forward end of the apparatus shown in Fig. 1, with parts of the reel structure omitted;

Fig. 3 is an enlarged view in side elevation of a detail of the apparatus shown in Figs. 1 and 2.

Figure 4:
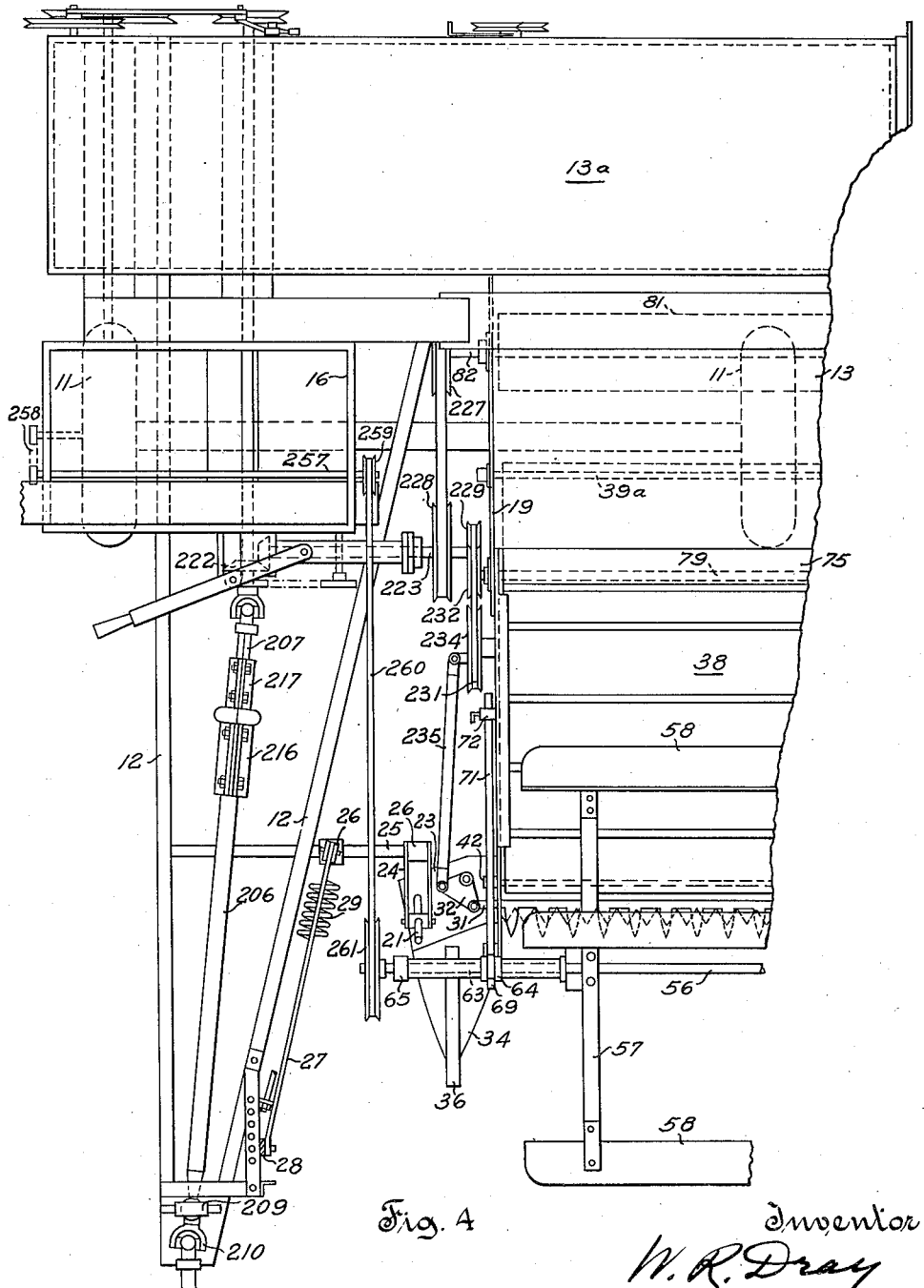
Fig. 4 is a fragmental plan view, with portions omitted, of the harvester-thresher of Figs. 1 and 2.

Referring to the drawings, the harvester-thresher is mounted on a supporting frame carried by the axle of a pair of traction wheels 11, the latter being preferably disposed so that the weight of the apparatus is balanced about the axis of the wheels. The supporting frame includes a forwardly projecting draft frame portion 12 which serves as a drawbar support through which tractive effort of a source of traction, such as a power tractor, may be supplied, and also as a support for a power shaft through which power is supplied from a tractor for operating several mechanisms of the apparatus. A housing 13 for the threshing mechanism is carried by the supporting frame, and an auxiliary header frame 14 is carried on the forward end of the thresher housing. A grain storage bin 16 is carried by the supporting frame at the stubbleward side of the thresher housing; and a transversely extending housing portion 13a enclosing separating mechanism is carried by the frame in position to receive material discharged from the threshing mechanism.

The header frame 14 is of troughlike form open at its forward and rear ends and has side walls 17 which may be flanged at their upper edges throughout the major portion of their length, the flange 18 on the outer side wall being of tapering curvature and acting as a guide to deposit cut grain on the header frame. The side walls 17 of the header frame fit closely within side walls 19 of the housing 13 for the threshing mechanism at the open forward side thereof, and the header frame is mounted on the housing 13 through a pivotal connection between the side walls of the header frame and the side walls of the housing 13, so that the lower forward edge of the header frame may be swung upward and downward to a desired position of adjustment relative to the ground.

The header frame may be actuated to desired position of adjustment relative to the ground by means of a rod 21, preferably pivotally attached at its lower end to a laterally extending flange or plate 23 integral with or secured to the inner side wall 17 of the header frame, and this rod is attached at its upper end to an arm 24 carried by a rod 25 pivotally mounted on the drawbar frame 12. Attached to the rod 12 is an actuating arm 26 which is attached to an actuating rod 27, the latter reaching to a suitable lever mechanism 28 of conventional form carried at the forward end of the drawbar frame, a balancing spring 29, shown as attached to a reverse extension of the actuating arm 26 and to the frame 12, preferably being provided to counterbalance the header frame.

At the forward end of the header frame 14 adjacent the bottom plate thereof is mounted a sickle device 30 of conventional design, as in the form of relatively movable cooperative operating cutting knives, and an actuating rod 31 for said sickle device is pivotally attached to an actuating plate 32 pivotally mounted on the laterally extending plate 23 carried by the inner side wall of the header frame.

A shield or guard 34 of generally rounded and forwardly tapering shape and open at its rear side is attached to the lower end of the inner side wall 17 of the header frame and the plate 23, and serves to protect operating mechanism, such as the header frame actuating rod 21 and sickle actuating plate 32, at the rear of the guard, and also serves to guide grain toward the sickle and header frame. The outer side wall of the header frame is extended, by an integral portion or separately secured element, in advance of the inner side wall of this frame, the upper edges, particularly the upper edge of this extended side wall being provided with a curved and forwardly tapering flange, as indicated at 35, the structure forming a relatively smooth surface splitter which enters the standing grain and serves to lift and gather fallen grain and move the same toward the sickle. The guard 34 and the splitter 35 may be supplemented by curved upwardly rising guard rings 36 secured to the guard and splitter.

Mounted within the header frame adjacent the lower edges of the side walls thereof is a traveling conveyer 38 of the draper belt type, and it travels over a driving roller 39 having shaft journals rotatably mounted in bearings on the side walls 17 of the header frame near the upper end thereof and on the adjacent portions of the side walls 19 of the housing 13, the driving shaft of this upper roller preferably being coincident with the axis on which the header frame has its pivotal movement on the side walls of the housing 13. This driving shaft, indicated at 39a, projects through the outer side wall 19 of the housing 13.

The lower or foot roller 40 about which the draper 38 travels, has shaft extensions rotatable in bearings 42 on the side walls 17 of the header frame.

A rotatable gathering reel is mounted on the header frame in operative position relative to the sickle and the traveling draper. This reel includes a rotatable shaft 56 and a pair of spaced sets of reel arms, each set including four arms 57 disposed ninety degrees apart and suitably attached to the shaft 56 for rotation therewith. A paddle or bat 58 is pivotally connected or hinged to the two corresponding arms 57 of the two sets, at their outer ends and along the forward edges of the arms, as indicated at 59. This hinged arrangement permits the paddles or bats to swing forwardly with respect to the reel arms in the direction of rotation of the reel as the arms pass forwardly beyond their uppermost position, and to swing rearwardly with respect to the arms as the latter pass beyond their lowermost position, the paddles being restrained in their swinging movement forwardly with respect to the reel arms by flexible inextensible straps 61 attached to the paddles and the supporting arms. The paddles are restrained in their rearward swinging movement by reason of their being pivoted at the forward edge of the reel arms and their cooperation with the beveled ends, indicated at 62, of the arms. This restraining means permits each paddle to swing, due to its own weight, to an angle of approximately thirty degrees forwardly and rearwardly of the plane of the supporting pair of arms for such paddle.

The reel shaft is rotatably supported on an extended bearing or a plurality of spaced bearings in an elongated tubular supporting housing 63. This supporting housing is mounted so as to be capable of up and down and forward and rearward movement, so as to permit any desired positioning of the reel with respect to the sickle. As indicated, the bearing housing 63 is mounted in two spaced strap like brackets 64, 65 carried by a supporting frame which includes a generally vertically extending member 67. Two U-shaped brackets 68 have their cross bars secured to the member 67, and their arms extending rearwardly and embracing the latter member and a generally vertical rod 69 pivotally secured at its lower end to the adjacent side wall 17 of the header frame or the laterally extending plate 23 thereon. The U-shaped brackets 68 and the reel support carried thereby are adjustable up and down on the rod 69, and these brackets have cross bolts, indicated at 70, preferably one at each side of the rod 69; and these bolts may be tightened to cause the side arms of the brackets to frictionally grip the rod 69 and hold the brackets and the reel structure carried thereby in any desired position of adjustment on the rod 69, to thereby position the reel carried thereby at any desired height above the sickle.

An actuating rod 71 is secured by one of the clamping bolts 70 between the rear end portions of the upper bracket 68 and extends rearwardly to a U-shaped supporting bracket 72 in which this rod 71 may be clamped in any desired position of longitudinal adjustment. With the clamping bracket 72 in released condition, the rod 71 may be moved from the position of Figs. 2 and 3, and the support 63 and the reel carried thereby may be shifted to any desired position of adjustment.

It will be apparent that through the adjustable supporting arrangement described, the reel may be shifted up and down and forward and rearward to and maintained in any desired position of adjustment relative to the sickle.

Extending between each pair of supporting reel arms supporting a paddle 58 is arranged an adjustable or removable barrier, in the form of a flexible curtain 73 of canvas or the like. The radially outer end of this curtain is attached to the paddle 58 and the inner end is preferably secured to a rod 73a on which this end of curtain may be rolled to a desired extent. Removable clamps 74 having one arm braced against the reel arm and the other arm gripping the rod 73a and the portion of the curtain rolled thereon, in conjunction with the clamping bolts 74a passing through the reel arms, serve to hold the inner end of the curtain in fully extended or substantially fully or partially withdrawn condition, according to the predetermined position on the reel arms at which the clamps 74 are secured, with the bolts 74a disposed in selected ones of a plurality of suitably spaced bolt holes. During operation on a windy day, the curtains may be rolled back to a desired extent and clamped in partially or substantially fully withdrawn condition, as shown in connection with the horizontally extending reel arms of Fig. 1, to overcome adverse effects of the wind on the reel.

An endless feeding conveyer 75, in the form of a draper belt preferably provided with transverse bars or slats on the working surface thereof, is driven by a driving roller 76 and travels over a second roller 78 disposed above and somewhat beyond the upper roller 39 of the conveying draper 38. Shaft extensions of the rollers 76 and 78 are mounted in bearings in the side walls 19 of the housing 13, the shaft 79 of the driving roller 76 passing to the outer side of the outer side wall 19 of the housing 13. The rollers 76 and 78 are so positioned and the feeding draper 75 is so driven that the lower course of the latter draper travels, like the upper course of the conveying draper 38, toward the threshing mechanism in the housing 13.

The threshing cylinder, indicated at 81, comprises a rotatably shaft 82 on which are mounted through the intermediary of spaced annular disks, a circumferential series of spaced thresher bars 85 extending longitudinally of the cylinder.

The stationary concave element with which the thresher bars cooperate in the threshing operation includes a generally circular and preferably imperforate housing portion 87 beneath the threshing cylinder, and having one or more fixed threshing bars 97 on its inner surface, and a throat or ledge plate assembly at the forward edge of this housing portion, this assembly comprising a bent plate 89 having a portion mounted, preferably in an adjustable manner, on the bottom wall of the header frame and having its rear edge provided with a ledger plate 91, preferably adjustable, extending over the forward edge of the housing portion 87 and toward the threshing cylinder into close proximity to the path of the thresher bars 85.

The upper portion of the housing for the threshing cylinder follows and is relatively closely spaced from the path of the threshing bars 85 to a point adjacent the end of the upper feeding draper 75, the forward end of the housing being easily curved, as indicated at 100, and serving to guide grain downwardly toward the ledger plate 91 and the threshing bars moving past the same.

Power for operating the various mechanisms of the apparatus is derived from a main power shaft made up of longitudinally adjustable sections 206, 207. The forward section 206 is provided with a spherical journal portion 208 rotatably supported in a spherical bearing 209 which is pivotally mounted on the forward end of the drawbar frame 12 to move in a plane extending in the general direction of the axis of the shaft section 206. The shaft section 206 is arranged for connection, through a universal joint 210, to a power takeoff shaft on a tractor, and it is preferably arranged to be driven at speeds independent of the speed of travel of the tractor and harvester thresher.

The connection between the shaft sections 206 and 207 is preferably in the form of a combined slip clutch and telescopic connection, indicated at 216, 217, in detachable sections. The shaft section 207 is suitably connected, preferably through a universal joint and a beveled gear connection 222, to drive a transverse shaft 223 suitably mounted on the supporting frame.

The shaft 223 is provided with a V-groove sheave 226, the latter being connected with a V-groove sheave 227 on the operating shaft 82 of the threshing cylinder, through a V-belt 228, preferably with a suitable idler sheave cooperating with the belt to secure the desired tension thereof. A second V-groove sheave 229 is mounted on the shaft 223 and is connected through a V-belt 231 to a V-pulley 232 on the operating shaft 79 of the upper roller 76 of the feeding conveyer 75, and to a V-pulley 234 mounted on the inner side wall of the header frame, preferably through a suitable idler pulley. The sheave 234 drives a pitman 235, through an eccentric on the sheave, the pitman actuating the sickle device through its connection with the actuating plate 32 and the operating rod 31 of the sickle. The shaft 39a of the upper roller 39 of the feed draper 38 is preferably driven through a flexible belt drive from a sheave on the shaft 79, to impart the desired travel to such feed draper. A flexible belt drive 258 from an extension on the stubbleward traction wheel 11 to a pulley or sprocket wheel on a shaft 257, suitably mounted on the supporting frame, or the grain bin structure thereon, serves to drive this shaft 257 at a speed corresponding to the speed of travel of the apparatus over the ground. This shaft 257 is connected, through a sheave 259 on such shaft and a V-belt 260, to drive a V-groove sheave 261 on the inner end of the reel shaft 56. Through positioning of the shaft 257 with its axis in, or in close proximity to, alinement with the axis of the shaft 39a (as indicated in Figs. 1 and 4) about which the header frame 14 and parts carried thereby have their pivotal up and down movement, with the result that the distance between the shaft 257 and the reel shaft 56 is not appreciably affected by such adjustment of the header frame, and through the extended length and flexibility of this V-belt drive between the shaft 257 and the reel shaft, suitable driving cooperation of the belt 260 with the pulley 261 on the reel shaft is maintained throughout the various positions of adjustment of the reel shaft. And this ground or traction wheel drive of the reel, independently of the sickle, threshing, conveying, and separating mechanisms, permits travel of the apparatus through a field at any desired speed over a wide range, with assurance that the reel is always operating at a proportionate and proper speed, while permitting a constant speed, or any desired speeds of operation of the sickle, threshing, conveying and separating mechanisms.

It should be understood that features and operating effects of the invention disclosed hereinabove have definite commercial applications and utility other than in the particular apparatus described and the invention is to be considered as embrasive of these various applications and utilities. And it is not desired that the invention be limited to the exact details of construction shown and described herein for obvious modifications may occur to persons skilled in the art.

It is claimed and desired to secure by Letters Patent:

1. In a harvester-thresher, a frame mounted on traction wheels, threshing mechanism and harvesting mechanism carried by said frame, said harvesting mechanism comprising a support, and a harvesting sickle and a rotatable gathering reel mounted on said support in operative position with respect to said sickle and adjustable up and down and fore and aft with respect to said sickle, said support for said harvesting mechanism being pivotally mounted along a transversely extending axis on a part fixedly associated with said frame, a driving connection for the shaft of said gathering reel, said driving connection comprising a transversely extending shaft mounted on said frame with its axis displaced from and above the axes of said traction wheels and approximately coinciding with the pivotal axis of said support, and a single flexible driving belt cooperative with a driving pulley on said transverse shaft and a pulley on said reel shaft for driving the latter shaft from said transverse shaft.

2. In a harvester-thresher, a supporting frame mounted on laterally spaced traction wheels, threshing mechanism mounted on said frame, a header platform pivotally mounted for up and down movement on said frame on a transverse axis located forwardly of said threshing mechanism and above the axes of said traction wheels, said header platform having a cutting sickle at its forward end and a conveyer disposed rearwardly of said sickle for conveying harvested material to the entrance to said threshing mechanism, and a rotatable gathering reel whose shaft is adjustably mounted on said header platform over said cutting sickle and movable up and down and fore and aft with respect thereto, and a power drive for said reel shaft comprising a transverse shaft mounted in fixed position on said supporting frame and substantially coaxial with the pivotal mounting axis of said header platform, a V-groove driving sheave on said transverse shaft, a V-groove driven sheave on said reel shaft, and a flexible V-belt cooperative with said sheaves and operative to drive said reel shaft in any of the positions of adjustment of said header platform relative to said supporting frame and of said reel relative to said cutting sickle.

3. In a harvester-thresher, a frame mounted on traction wheels, a threshing mechanism mounted on said frame, a harvesting mechanism comprising a header platform pivotally mounted for up and down movement on said frame on a transversely extending axis located forwardly of said threshing mechanism and above the axes of said wheels, said header platform having a cutting sickle at its forward end and a conveying mechanism disposed rearwardly of said cutting sickle for conveying harvested material from said sickle to the entrance to said threshing mechanism, and a rotatable gathering reel whose shaft is adjustably mounted on said pivotally mounted header platform over said sickle, said reel shaft being adjustable up and down and fore and aft with respect to said sickle, a drive shaft carried by said frame, power transmitting means for effecting operation of said threshing mechanism, said conveying mechanism and said sickle from said drive shaft, and a power transmitting connection for driving said reel, said power transmitting connection comprising a pulley on a transversely extending shaft mounted on a part fixedly associated with said frame with the axis of said shaft displaced from and above the axes of said traction wheels and approximately coinciding with the pivotal mounting axis of said pivoted header platform, and a driving connection from said latter shaft to said reel shaft in the form of a single flexible belt drive from a pulley on said transverse shaft directly to a pulley on the shaft of said reel.

4. In a harvester-thresher, a frame mounted on traction wheels, threshing mechanism mounted in an enclosing housing carried by said frame, harvesting mechanism comprising a header platform pivotally mounted on a transversely extending axis above the axes of said traction wheels on a forward portion of said enclosing housing for up and down movement thereon, a cutting sickle at the forward end of said header platform, a rotatable gathering reel in operative position with respect to said sickle, and a conveying mechanism disposed rearwardly of said sickle for conveying cut material to said threshing mechanism, said sickle, reel and conveying mechanism being carried by said pivoted header platform, and the shaft of said reel being adjustable on said header platform up and down and fore and aft with respect to said sickle, power transmitting means carried by said frame for operating said threshing and conveying mechanisms and said sickle, and a driving connection to said reel shaft for effecting desired operation of said reel independently of the position of adjustment of said header platform or said reel shaft as to up and down adjustment thereof, said driving connection comprising a transversely extending shaft mounted on said frame with its axis displaced from and above the axes of said traction wheels and approximately coinciding with the pivotal mounting axis of said header platform, and a single flexible V-belt connection from a V-groove sheave on said transverse shaft directly to a V-groove sheave on said reel shaft.

WALTER R. DRAY.

CERTIFICATE OF CORRECTION.

Patent No. 2,359,409. October 3, 1944.

WALTER R. DRAY.

It is hereby certified that error appears in the printed specification of the above numbered patent requiring correction as follows: Page 4, first column, line 31, claim 1, after "pivotal" insert --mounting--; and that the said Letters Patent should be read with this correction therein that the same may conform to the record of the case in the Patent Office.

Signed and sealed this 19th day of December, A. D. 1944.

Leslie Frazer (Seal)                  Acting Commissioner of Patents.